United States Patent [19]
Burny et al.

[11] 3,805,413
[45] Apr. 23, 1974

[54] STRAIN SIMULATOR FOR FLIGHT CONTROLS
[75] Inventors: Gilbert Burny; Robert Dalle, both of Marcinelle; Jacques Collet, Anderlues, all of Belgium
[73] Assignee: Ateliers De Constructions Electriques de Charleroi-ACEC, Charleroi, Belgium
[22] Filed: Oct. 21, 1971
[21] Appl. No.: 191,498

[30] Foreign Application Priority Data
Oct. 22, 1970  Belgium .................................. 95424

[52] U.S. Cl. .................................. 35/12 S, 244/83 D
[51] Int. Cl. .................................. G09h 9/08, B64g 7/00
[58] Field of Search .................. 35/12 S; 244/83 D

[56]  References Cited
UNITED STATES PATENTS
2,866,611  12/1958  Thompson .................. 244/83 D
2,851,795  9/1958   Sherman ..................... 35/12 S
3,303,714  2/1967   Fontaine ..................... 244/83 D X
3,067,970  12/1962  Divola et al. ................ 244/83 D
2,857,120  10/1958  Hubbard ...................... 244/83 D
2,849,198  8/1958   Borngesser .................. 244/83 D

*Primary Examiner*—Robert W. Michell
*Assistant Examiner*—L. R. Oremland
*Attorney, Agent, or Firm*—Raymond A. Robic; J. Ernest Kennedy; Arthur Schwartz

[57]  ABSTRACT

A strain simulator for flight controls comprising a frame, at least one flight control mounted on the frame, a resilient device simulating the reaction of a rudder or an aileron of an aircraft, and at least one linkage element interconnecting the flight control to the resilient device. The resilient device comprises a first lever, a second lever connected to the first lever, a shaft mounted on the frame and around which rotates the first lever, a ring maintained at a predetermined distance from the shaft of the first lever and in which slides and pivots the second lever, and at least one spring bearing on one side on the ring and on the other side on the second lever.

10 Claims, 6 Drawing Figures

3,805,413

STRAIN SIMULATOR FOR FLIGHT CONTROLS

The present invention relates to a strain simulator for flight controls adapted for use in a flight simulator for the training of aircraft pilots.

The strain simulators for flight controls comprise generally a frame secured to the cockpit of the aircraft, at least one flight control (for example a wheel or a stick) mounted on the frame, a resilient device simulating the reaction of the rudder or of the aileron of an aircraft mounted on the frame, and a linkage element (for example a cable or an oil pipe having controlled and controlling pistons) interconnecting the flight control to the resilient device. In the known simulators, the strain simulators for flight controls generally comprise an assembly of two springs acting in opposite directions and which tend to return the flight control connected thereto to its rest position. As it is very difficult to provide springs of equal lengths or to ensure that springs which were originally of equal lengths will remain the same during the full life thereof, the use of two opposed springs for a strain simulator used in flight controls has the drawback that an equilibrium position for such flight controls may vary with time and, on the other hand, render difficult the application of a variable pre-stressing simulating the speed of the aircraft.

The object of the present invention is to provide a strain simulator which feels real, which is of simple construction, which may be regulated easily, and which does not have the drawbacks of the known simulators.

The strain simulator, in accordance with the invention, is characterized in that the resilient device comprises a first lever, a second lever which may be generally colinear with at least a portion of the first lever and pivotally connected thereto, a shaft or pivot secured to the frame and around which the first lever rotates, and a ring maintained at a predetermined distance with respect to the pivot of the first lever by a suitable support means and in which the second lever slides. The second lever may pivot in the ring or the ring and lever may pivot with respect to the ring support means. A spring is further provided to bias the second lever away from the pivot axis of the first lever.

In a preferred embodiment of the invention, the distance between the shaft of the first lever and the ring may be varied by means of a control device operated by a device simulating the speed of the aircraft. Similarly, the angle of inclination between the plane including both the pivot axis of the shaft of the first lever and the longitudinal axis of the ring, on one hand, and the straight line defining the direction of operation of th linkage element joining the flight control means and the first lever, on the other hand, may preferably be modified by a device operated by a trim control device mounted on the frame.

The invention will now be disclosed with reference to preferred embodiments thereof and to the accompanying drawings in which.

Figure 1:
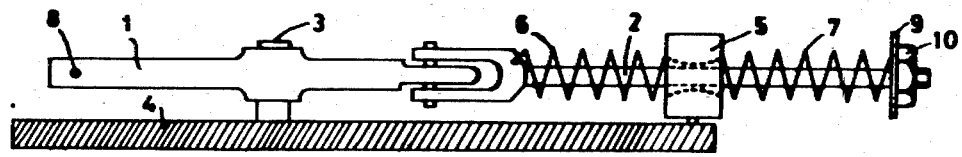
FIG. 1 is a shematic view of a strain simulator in accordance with the invention.

A strain simulator for flight controls comprises as an essential component thereof a resilient device. In FIG. 1, this device comprises a first lever 1 and a second lever 2, connected to the first lever 1 by means of an articulated joint. The first lever 1 pivots around a shaft 3 secured to a portion 4 of the frame of the simulator. The second lever 2 slides and pivots in a ring 5, maintained at a predetermined distance from the shaft 3 and also secured on the portion 4 of the frame. The pivotal movement of the lever 2 is rendered possible, in this instance, for example, by means of an appropriate gap between the lever 2 and the ring 5. A tension spring 6 and a compression spring 7 bearing each at one end on the ring 5 and at the other end on a portion of lever 2, maintain under constant tension the joint between levers 1 and 2. A cable 8 positioned perpendicularly with respect to the plane of the drawing interconnects the lever 1 to a flight control member F schematically shown in FIG. 3, not shown. The flight control member, for example a stick, may be connected by the cables to plural strain simulators, for example one for the vertical rudder and one for the horizontal rudder.

When, by acting on the stick, a pull is exerted on the cable 8, the lever 1 pivots around the shaft 3 and drives the lever 2 which slides slightly in the ring 5 and pivots around the center of the ring. Due to the tension exerted on the joint between levers 1 and 2 by means of springs 6 and 7, a reaction couple appears on the lever 1 causing a reaction force on the cable 8. This force is transmitted to the flight control member and is felt by the pilot under training.

Figure 4:
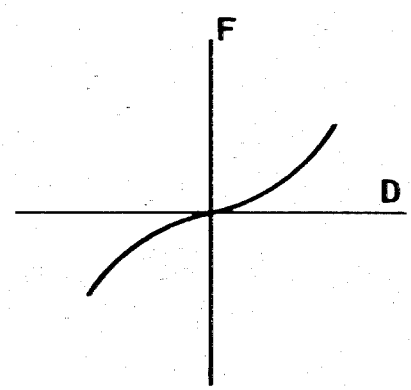
FIGS. 4 and 5 are diagrams illustrating the strain felt with the simulator in accordance with the invention depending on the position of the flight control.

The strain simulator in accordance with the invention produces a force F in cable 8 the shape of which is illustrated in FIG. 4. If a certain variation in the strain as a function of the displacement D of the cable is realized, this variation follows always the same law whatever may be the tension in the springs. The device in accordance with FIG. 1 consequently permits a very easy adjustment of the precise value of the reaction, for example by a judicious choice of springs 6 or 7 or by the precise location of the spring on the lever 2. Since the two springs 6 and 7 always act in the same direction, that is they always exert a tension on the joint between levers 1 and 2, it is possible to use a single spring, for example spring 7 bearing on a washer 9 held in place by a nut 10. The regulation of the tension of the spring 7 may then be realized easily by rotating nut 10. One may obviously envisage an automatic device for screwing or unscrewing the nut 10 as a function of a program elaborated by a calculator of the flight simulator. A calculator or computer suitable for use with such a programmed adjustment is shown in the U.S. Pat. No. 3,513,246 to Fisch et al, entitled "Analog Computer." Other such computers are shown in U.S. Pat. No. 3,363,331 to Hunt entitled "Flight Simulator," and U.S. Pat. No. 3,538,624 to Minnich et al entitled "Aircraft Simulation." Obviously, these are exemplary only to illustrate that the computer envisioned for use with this system may be a conventional element known in the flight simulator art and constitutes no part of the present invention per se.

Figure 2:
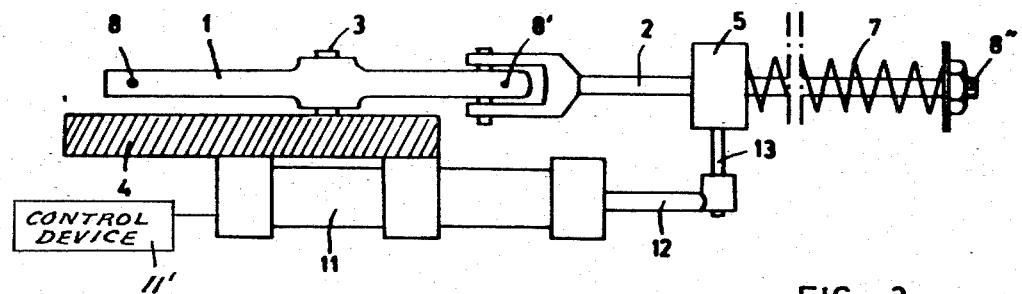
FIG. 2 is a second embodiment of a strain simulator in accordance with the invention.

If such a regulation is envisaged, the device permits a more simple solution as illustrated in FIG. 2. The references shown in this figure which are identical to the ones of FIG. 1 designate the same elements and, consequently, need not be described. In such embodiment, the position of the ring 5 is adjustable with respect to the shaft 3 by means of a jack 11 the piston 12 of which supports a pin 13 upon which pivots ring 5. In this case, the clearance between lever 2 and ring 5 is not required for permitting the pivotal movement of the ring as in FIG. 1. The position of the pin 13 or of the ring 5 may now be varied very rapidly in function, for example, of a device 11' simulating the speed of the air with respect to the aircraft. Such a device may, for example, include a computer receiving instructions concerning the speed of the aircraft, the speed of the wind, and the orientation of the aircraft with respect to the wind. As a function of these instructions, the computer may evaluate the position to be occupied by the ring 5 and the control device 11' may operate the jack 11 accordingly. Consequently, the pilot under training, feels on the flight control of the simulator the same reactions as the ones which would be felt on the flight control of an aircraft in which the assumed conditions exist.

The cable 8 may control the system of levers 1 and 2 at any suitable position and not only at position 8. For example, the positions 8' and 8'' may also be suitable. The lever 1 may be elbowed if the space conditions render such a structure desirable. It is also possible to replace the cables by other elements for transmitting the forces or the couples.

Figure 3:
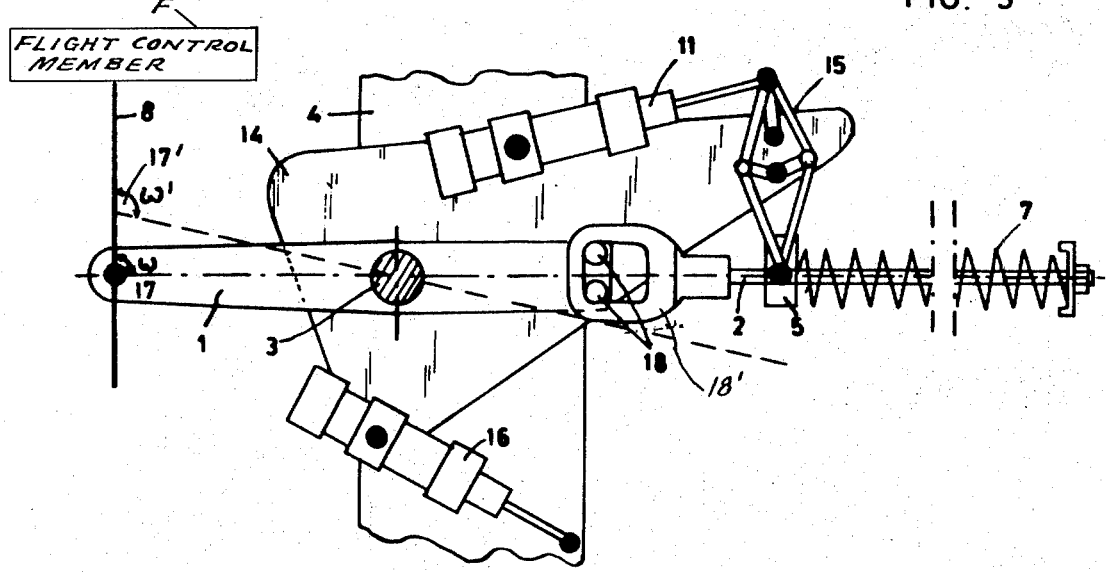
FIG. 3 is a third embodiment of a strain simulator in accordance with the invention.

The device illustrated in FIG. 3 is shown turned 90° with respect to those of FIGS. 1 and 2. The same elements are again illustrated by the same reference numerals and need not consequently be described. The device according to FIG. 3 possesses one additional feature with respect to FIGS. 1 and 2 because it permits to simulate the trim. For doing so, the ring 5 is secured to a support 14 which is itself pivotable around shaft 3. Instead of regulating the position of the ring 5 as illustrated in FIG. 2, directly by means of a jack 11, the jack 11 may operate a quadrilateral element 15 known under the name of Peaucellier inverter and it is by means of this element that the ring 5 is secured to the support 14. The pivotal movement of the support 14 around the shaft 3 may be controlled by a jack 16 or by another element for transmitting forces or couples. The jack 16 is secured to the support 14 while the end of its piston bears on the portion 4 of the frame. If the flight control displaces the connecting point 17 of the linkage element, that is of the cable 8, to the point 17', a reaction is felt in the cable 8. This reaction disappears if one operates the jack 16, for example by acting on a stick, not shown, within reach of the pilot under training, so that he may bring to the value ω' the angle of inclination ω between the straight line defining the direction in which acts the linkage element (corresponding to the cable 8) and the plane including by the axis of the shaft 3 and the center of the ring 5. This is realized by means of the rotation of an angle ω' - ω of the support 14 controlled by the jack 16. A suitable conventional control linkage arrangement not shown in FIG. 3 preferably enables cable 8 to move in a straight line as shown to cause displacement of lever 1. It is also apparent in FIG. 3 that the lever 2 in accordance with this invention normally lies in a plane extending generally parallel to and including both the pivot axis 3 of the first lever and the center of ring 5 when the flight control means (and the resilient device) is at rest.

The articulated joint between the levers 1 and 2 may comprise two pivotal axes 18 symmetrical with respect to the central plane of levers 1 and 2 and nesting in two corners of a square-hole link 18' fixed to lever 2. With such a joint, it is possible to take into account the great sensitivity of the zero position of the rudders and of the ailerons.

Figure 5:
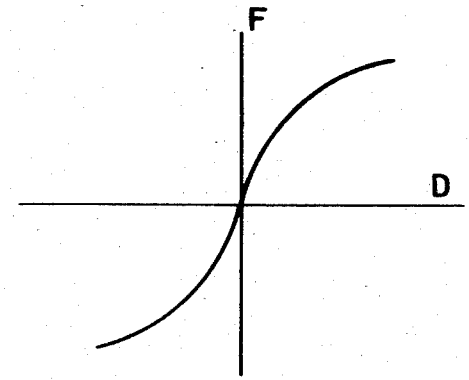
Figure 6:
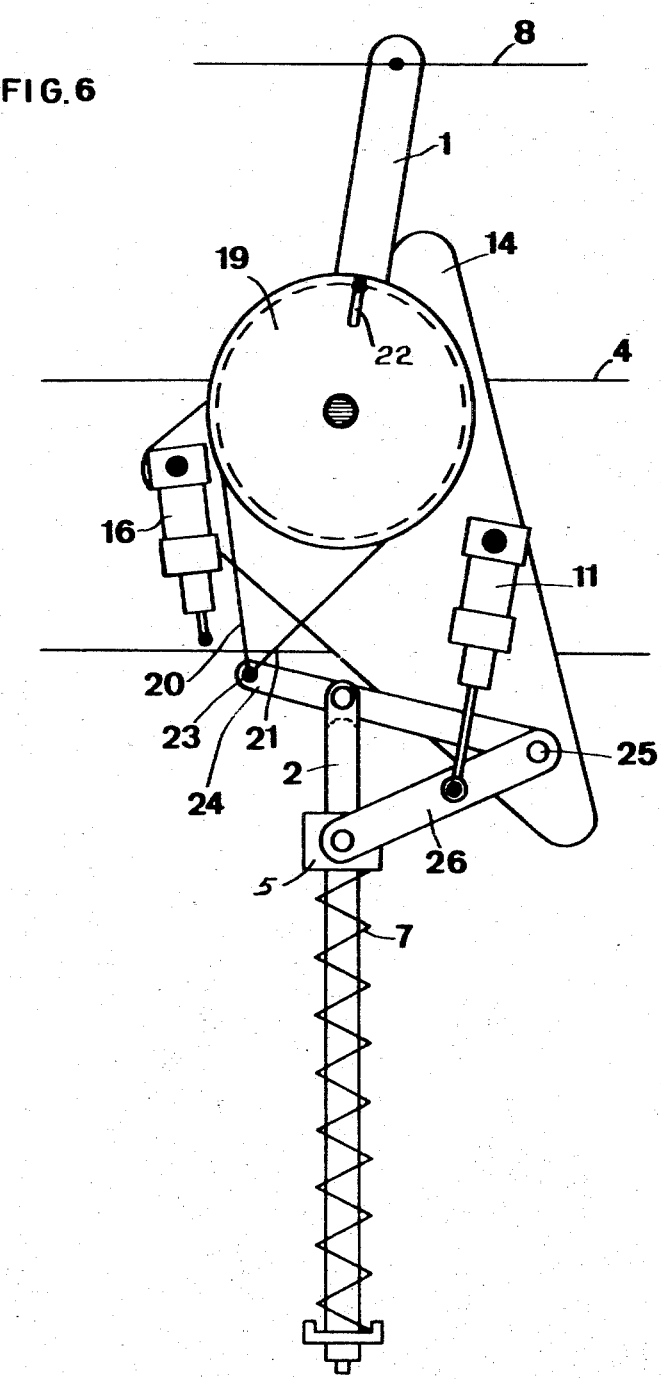
FIG. 6 illustrates another embodiment of a strain simulator in accordance with the invention.

When the simulator must reproduce a strain F as a function of a displacement D of the flight control, as illustrated in FIG. 5, an embodiment in accordance with FIG. 6 may be envisaged. This embodiment is very similar to the one shown in FIG. 3 and fulfills in principle the same functions. The lever 1 is no more connected directly to lever 2 by means of a joint, but is equipped with a cam 19. On the drawing, a cam having a circular profile is shown, but it is obvious that the profile of the cam 19 may be chosen as a function of the strain F - the displacement D which must be realized and, consequently, such profile may vary greatly from a circular one. In a groove of cam 19 are located two cables 20 and 21. These cables are fixed with respect to the cam in a slot 22 of such cam and are connected at a point 23 to a lever 24. The lever 24 may rotate around an axis 25 secured to the pivoting support 14 and is connected by means of a joint to lever 2. When the cam 19 rotates in a manner so as to tension cable 20, the cable 21 is slackened and, inversely, if the cam 19 is rotated in the opposite direction, the cable 20 is slackened while the cable 21 is tensioned. As the amplitudes of movements of lever 1 are relatively low, the slack in the cables 20 and 21 may be prevented by tightening them one against the other, for example by means of a plier element not shown. Instead of the cables, other flexible linkage elements may be used such as for example chains. In this last case, the cam 19 would not have a slot therein but teeth to engage the chain.

Instead of the quadrilateral element 15 illustrated in FIG. 3, a simple lever 26 may be provided. Such lever rotates around the axis 25 and supports the ring 5. The position of the ring 5 is controlled, as illustrated in FIG. 3, by means of a jack 11, but in accordance with FIG. 6, this control is done by means of the lever 26.

If a lower precision may be envisaged, the lever 24 may be deleted and the cables 20 and 21 connected directly to lever 2.

We claim:

1. In a strain simulator for flight control having a frame, at least one flight control member mounted on said frame, a resilient device adapted to simulate a reaction from a rudder or from an aileron of an aircraft and at least one linking element joining said flight control member and said resilient device, the improvement wherein said resilient device comprises:

a. a first lever mounted on said frame for pivotal movement about an axis transverse thereto and intermediate the ends thereof; said linking element being connected to said first lever to cause pivoting thereof;

b. a ring and means holding said ring at a predetermined distance from said pivot axis of said first lever;

c. a second lever and means pivotally connecting one end of said second lever to said first lever, said second lever further slidably extending through said ring, said second lever and said ring being dimensioned with respect to each other so that said lever is pivotable within said ring about an axis extending transversely thereto, d. at least one spring having one end bearing against said ring and the other end against said second lever and urging said second lever away from the pivot axis of said first lever whereby to simulate the reaction of a rudder or of an aileron of the said aircraft.

2. In an aircraft flight control simulator, a strain simulator comprising:
 a. a frame;
 b. at least one flight control means mounted on said frame;
 c. a resilient device connected to said flight control means for resisting movement thereof in a manner simulating the reaction of an aircraft control surface, said resilient device comprising:
  1. a first lever pivotally mounted on said frame for rotation about an axis extending transversely thereto and intermediate the ends of said first lever, and being connected to said flight control means;
  2. a ring, and means supporting said ring on said frame, said support means retaining said ring at a predetermined distance from said pivot axis of said first lever;
  3. a second lever and means pivotally connecting one end of said second lever to said first lever, said second lever lying generally in a plane extending parallel to and including the pivot axis of said first lever and the center of said ring when the flight control means is in its neutral position, said second lever further slidably extending through said ring and being pivotable with respect to said ring support means;
  4. at least one spring means connecting said ring and said second lever, said spring means exerting a constant net bias on said second lever in a direction away from the pivot axis of said first lever;
  5. said first lever being an elongated member, and said second lever extending generally colinearly with at least a portion of said first lever between the pivot axis of said first lever and said ring.

3. The flight control strain simulator recited in claim 2 wherein said first lever is connected to said flight control means at one end thereof and said second lever is connected to the opposite end of said first lever.

4. A strain simulator as defined in claim 2 wherein said means connecting said levers is an articulated joint comprising a square-hole link fixed to said second lever and a pair of pins on and transverse to said first lever, symmetrical to the longitudinal axis of said first lever and nesting in two corners of the hold of said square-hole link.

5. A strain simulator as defined in claim 2 wherein said ring supporting means comprises means adapted to vary said predetermined distance between said ring and said pivot axis of said first lever and also comprises a control device connected to and operating said distance varying means as a function of the speed of said aircraft being simulated.

6. A strain simulator as defined in claim 5, wherein said distance-varying means is a hydraulic jack having a piston rod and wherein said ring is pivotally mounted on said rod.

7. A strain simulator as recited in claim 2 including a linking element 8 connecting said flight means F and said first lever 1, and means causing displacement of said linking element along a straight line lying in a plane extending normal to the pivot axis of said first lever, said line extending in a first angular direction with respect to a line connecting the pivot point of said first lever and the center of said ring when the strain simulator is in the untrimmed position, and further including a trim-responsive control device 16 operable to vary said first angular direction whereby, upon adjustment of said trim-responsive control device, the displacement of said linking element is caused to occur along a straight line extending in a different angular direction than said first angular direction.

8. A strain simulator as defined in claim 7 wherein said distance-varying means comprises a ring support mounted on said frame to pivot about said first lever pivot axis, said ring support further comprising a Peaucellier inverter mounted to pivot about a pair of axes on said support, and a hydraulic jack operatively interconnecting said support and one arm of said inverter whereby said ring is displaced along said second lever by action of said jack through said Peaucellier inverter.

9. A strain simulator as defined in claim 8, wherein said trim responsive control device comprises a hydraulic jack interconnecting said support and frame to cause pivoting of said support.

10. In an aircraft flight simulator, a strain simulator comprising:
 a. a frame
 b. at least one flight control means mounted on said frame
 c. a resilient device connected to said flight control means for resisting movement thereof in a manner simulating the reaction of an aircraft control surface, said resilient device comprising:
  1. a first lever connected to said flight control means and pivotably mounted on said frame for rotation about a transverse axis;
  2. an arcuate cam fixed to said first lever to pivotally rotate therewith, said cam having a peripheral groove;
  3. a pair of flexible links extending in opposite directions in said groove, each link having one end secured to said cam;
  4. a pivotally mounted support means for said resilient device;
  5. a second, third and fourth lever;
  6. a pivotally supported ring member;
  7. said ring member being pivotally mounted on said support means by said fourth lever;
  8. said third lever being pivotally mounted to said support means at one end and attached to said flexible links adjacent its distal end;
  9. said second lever being pivotally attached at one end to said third lever intermediate the ends of said third lever, and slidably extending through said ring member with its distal end extending beyond said ring member, whereby pivotal movement of said first lever causes axial motion of said second lever through said ring member by means of said flexible links and said third lever;

10. at least one spring means connecting said ring and second lever, said spring means exerting a constant net bias on said second lever in a direction away from said third lever;
11. a first actuator means operatively interconnecting said support means and said fourth lever for axially moving said ring relative to said second lever for changing the net bias of said spring means on said second lever; and
12. a second actuator means operatively interconnecting said frame and said support means for adjusting the trim position of said resilient device by altering the relative angular positions of said first lever, cam and flexible links with respect to said support means and said second, third and fourth levers.

* * * * *